United States Patent [19] [11] 4,214,395
Caldwell, Jr. [45] Jul. 29, 1980

| | | | |
|---|---|---|---|
| [54] | LEVER ASSEMBLIES | 3,310,903 | 3/1967 Binvignat ............... 273/80 B |
| [76] | Inventor: Benjamin P. Caldwell, Jr., P.O. Drawer D, Bluffton, S.C. 29910 | 3,432,958 | 3/1969 Bellinger ............... 43/18 R X |
| | | 3,570,164 | 3/1971 Tozier ............... 43/18 R |
| [21] | Appl. No.: 952,208 | 3,625,193 | 12/1971 Palma ............... 124/23 R |
| | | 4,015,360 | 4/1977 Herter ............... 273/80 B X |
| [22] | Filed: Oct. 17, 1978 | 4,024,666 | 5/1977 Carver ............... 43/18 R |

FOREIGN PATENT DOCUMENTS

Related U.S. Application Data

1412952  11/1975  United Kingdom ............... 43/18 R

[63] Continuation of Ser. No. 727,436, Sep. 28, 1976, abandoned.

Primary Examiner—Gary L. Smith
Assistant Examiner—Robert P. Olszewski
Attorney, Agent, or Firm—Leonard S. Knox; William F. Frank

[51] Int. Cl.² ............................................. A01K 87/00
[52] U.S. Cl. ................................. 43/18 R; 124/23 R; 273/80 B

[57] ABSTRACT

[58] Field of Search ............... 43/18 R, 186 F, 22, 43/23; 273/80 B; 52/720, 727, 731; 114/90; 267/41, 160; 124/23 R, 24 R, 25; 272/104; 343/896, 900; 428/35

A resilient assembly comprising two resilient members so constructed as to provide a selected stiffness factor. In its fundamental form the assembly, when embodied in a practical structure, such as a fishing rod, and subjected to a load transversely applied to one end or along its length, functions similarly to a conventional tapered fishing rod up to some predetermined limit of flexure and, upon reaching such limit, additional resistance to flexure is introduced automatically.

[56] References Cited

U.S. PATENT DOCUMENTS

| 1,755,159 | 4/1930 | Cowdery et al. ............... 43/18 R |
| 2,017,303 | 10/1935 | Bear ............... 43/18 R |
| 2,478,131 | 8/1949 | Rossi ............... 43/18 R |
| 2,808,278 | 10/1957 | Snyder ............... 343/900 X |
| 2,816,389 | 12/1957 | Sens ............... 43/18 R |

22 Claims, 11 Drawing Figures

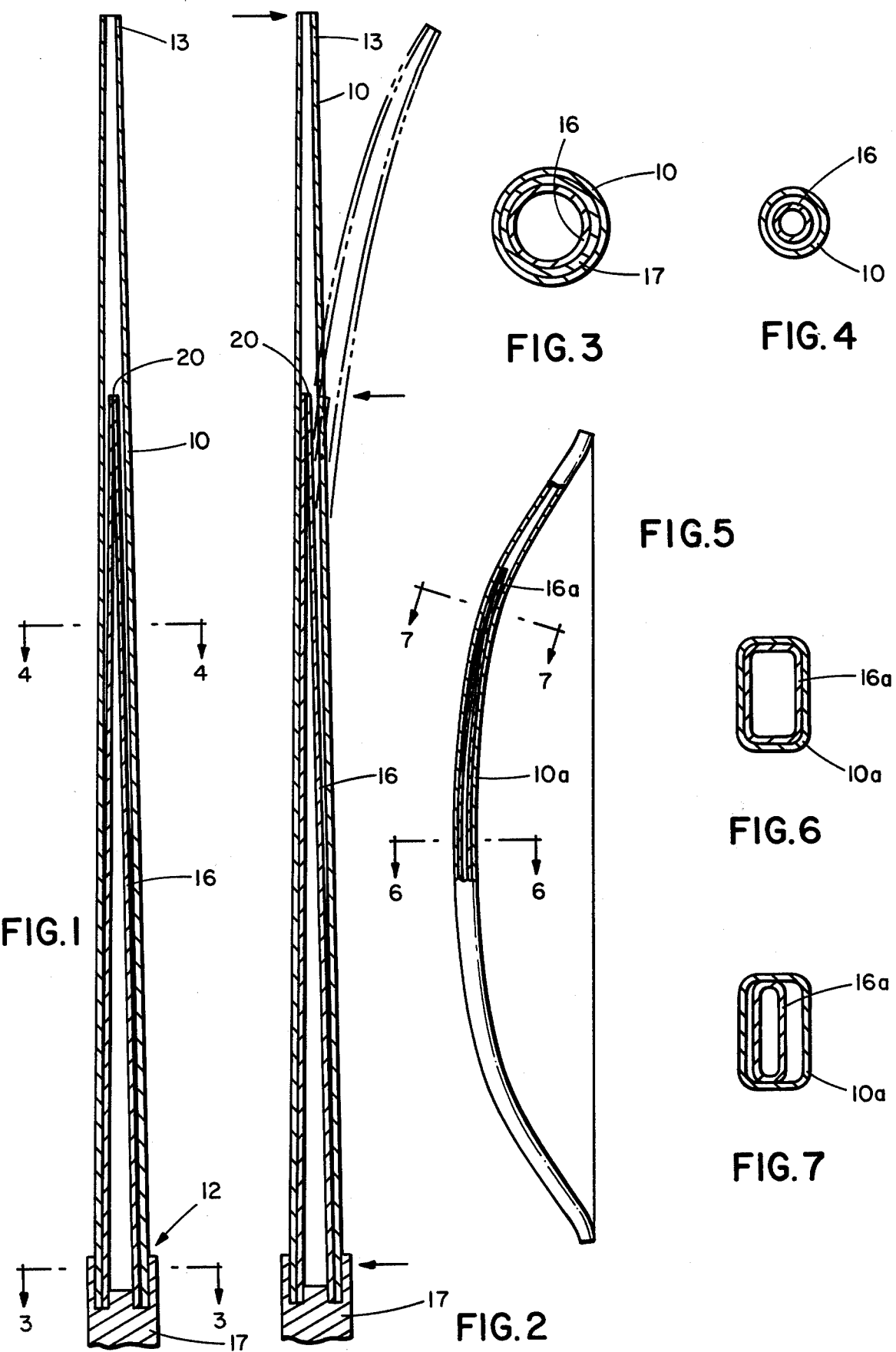

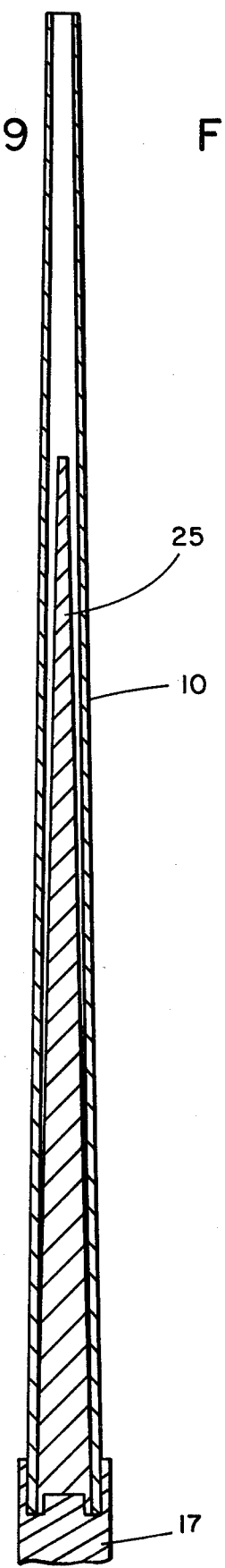
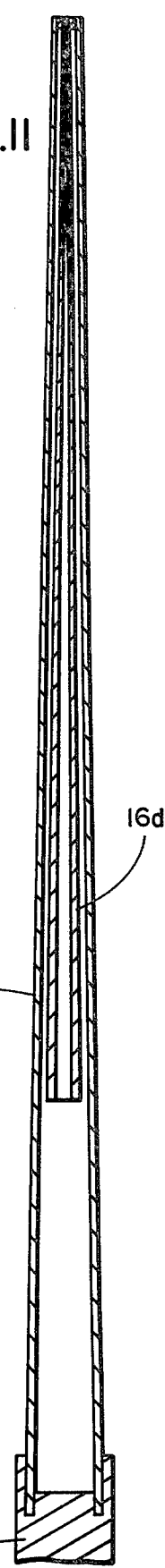

LEVER ASSEMBLIES

This is a continuation of application Ser. No. 727,436 filed Sept. 28, 1976 now abandoned.

BACKGROUND OF THE INVENTION

Although the invention will be disclosed as embodied in a fishing rod, it will become evident that the principles of the invention may be embodied in such objects as vaulting poles, whip antennas, flag poles, and other structures of a cantilever nature when the resistance to flexure of the free end is desirable to be increased automatically in proportion to the applied load.

It is recognized by anglers that the resistance to flexure of a fishing rod ideally be proportional to the size of the fish and/or the weight of a lure. For small fish the rod flexes readily and there is no good reason to use an oversized rod where a small one will do. Analogously, large fish are best caught with a large rod. However, in order to handle the larger fish as well as those which are smaller, the fisherman will frequently overburden himself. Consequently, a single rod having variable performance is a desirable objective.

Attempts have been made to attain the foregoing objective by the use of a hollow rod equipped with a longitudinally-manually-shiftable plug or core, for example, as disclosed in U.S. Pat. No. 3,570,164. However, in this case, the pliancy of the rod is a step function, depending on the selected relation between the core and body of the rod, whereas I have found that a rod having a smooth transition from a lower to a higher limit is easier to manipulate and responds automatically in a more truly proportional manner. In the said patent, shifting of the core away from or toward the tip consists in locating a tapered core member at one or another predetermined axial position within and transversely spaced from an identically internally tapered rod member. If the core member and rod member are thus spaced apart in all positions of the core member, no augmented resistance to flexure is to be seen and the advantages set forth herein as desirable are not attained.

DESCRIPTION OF THE INVENTION

The present invention provides two distinct ranges of response to flexure when force is applied to the distal end of a cantilever beam assembly by means of an inexpensive, uncomplicated construction. In substance, a fishing rod embodying the invention, regarded apart from the handle, reel and line guides, comprises a sleeve, desirably externally tapered from the handle toward the tip to constitute what is referred to herein as the outer member, within which is located an inner member which is also tapered, but with an apical angle larger or smaller than the apical angle of the outer member. The inner member may be of uniform diameter. The interior aspect of the outer member and the exterior aspect of the inner member are regarded in one embodiment as cones or conical shells although pyramidal or other configurations for either or both are within contemplation. The inner member may, alternatively, be solid. Moreover the inner member may be longer or shorter than the outer member.

The material of the outer member and core member may be any resilient material capable of bending 180° or more, e.g. Fiberglas, graphite, plastics composition, wood, metal, etc. or combinations thereof with and without binders or reinforcement, e.g. fabric. The core member is secured to the outer member over a localized area adjacent the butt end by any appropriate expedient, as by fitting and gluing one within the other. The load is applied to the tip end of the assembly. The outer and inner members are, as stated, fixed together at a common end, e.g. the handle, and the distal end of the inner member will lie between the tip and the fixed end. In the ordinary case the zone of bending will be somewhat beyond the handle, and the inner member or core element will terminate forwardly at a point which is located at between 35% and 65% of the distance measured from the handle toward the tip of the assembly. The inside surface of the outer member will define, with the core member, what may be regarded as a generally frusto-conical space of increasing annular cross section. That is to say, a transverse cross section taken at right angles to the longitudinal axis will show an annulus of gradually increasing area from the inward or fixed end of the assembly to the tip.

The conicity of the sleeve and the core member respectively are mutually independent and are so selected as to yield the desired flexure over a specified range of loads, usually expressed as power, action or speed of recovery for the various kinds of fishing, e.g. fly casting, bait casting, spinning, tournament accuracy casting, distance casting, surf casting, bottom fishing, trolling, etc. and for any particular kind and size of fish. The complete rod may comprise jointed sections or may be in one piece. It is to be understood that if the joint shall fall along the length of the core member, this latter will be provided with its own splicing means.

The present invention is not to be confused with the so-called "double-built" rod which comprises two rods secured together for their entire length by cement and is, therefore, a single rod of some greater stiffness that of a single-built rod.

The tip of the invention rod may be extremely flexible, i.e. sensitive, to provide a rod such that the fisherman can feel the strike of a very small fish or the nibbling of a larger one, making for greater versatility. The transition in the resistance of the rod in passing from the single rod, i.e. core member inactive, through to the double rod, i.e. core member active is, in the case of the invention rod, smooth and will enable the fisherman to use just the right amount of power. Stated otherwise, the improved rod provides a greater sense of control over the fish which is not available with conventional rods. In the case of the conventional rod the fisherman has to contend with whatever stiffness exists, irrespective of the size of the fish and, if the rod is so stiff that it will not bend sufficiently, the fisherman fails to have the protection of the cushioning effect which would otherwise be available.

The mid and butt-sections can be made to have as much power as desired, by suitable selection of tapers, diameters, wall thicknesses and relative lengths of the inner and outer members. In the case of the invention, a rod of smaller diameter and/or shorter length will function as well as a conventional rod of larger diameter and/or greater length, and will safely and repeatedly bend beyond the usual safe limit of 90°.

Embodiments of the invention rod have been found to be less tiring to the angler. It will be recognized that a fishing rod must have "backbone" to successfully handle fish of any size, i.e. weight category. Conventional rods are rated and described by their manufacturers as capable of handling fishing lines with a 20-pound test strength or fishing lines having a 40-pound test strength. The backbone of strength built into each model is designed to withstand the upper limit of the load imposed on the line. As the conventional rod has no compounding stiffening quality, it is constructed with too much rigidity to handle with effiency any loads imposed which are less than the top rated limit of the rod. The rod bends to fight the fish. However, with the invention rod the bending is compound or, otherwise stated, two rods are built into one, the inner member coming into play only when called upon, and only to the extent called upon, vis., in a manner to supplement the action of the outer member.

With respect to the foregoing, the "action" of a fishing rod may be described best as the curvature it assumes when under load, and "recoil power" may be defined as the ability to cast a weight through the air.

BRIEF DESCRIPTION OF THE DRAWINGS

FIG. 1 is a medial, longitudinal cross section of a fishing rod embodying the principles of the invention in unloaded or relaxed condition;

FIG. 2 is a view similar to FIG. 1, but with the tip of the rod in bent condition;

FIG. 3 is a cross section taken on the line 3—3 of FIG. 1;

FIG. 4 is a cross section taken on the line 4—4 of FIG. 1;

FIG. 5 is a combined elevation and cross section of an archery bow embodying the principles of the invention;

FIG. 6 is a cross section taken on the line 6—6 of FIG. 5;

FIG. 7 is a cross section taken on the line 7—7 of FIG. 5;

FIG. 8 is a side elevation of another embodiment similar to FIG. 1, but comprising a core member which is itself hollow and has the same taper in both members;

FIG. 9 is another modification with the members having different conical form;

FIG. 10 is another modification in which the inner member is a straight tube;

FIG. 11 is a modification in which the inner member extends from the tip of the rod, where it is secured, to a point which is spaced away from the butt end.

In these drawings the degree of taper and wall thicknesses have been exaggerated for clarity.

Adverting to the drawing I have shown (FIG. 1), by way of example, a double cantilever rod assembly for use as component of a fishing rod to provide the several advantages described above. The assembly comprises a tubular conical body or outer member 10 having uniform wall thickness. Alternatively, the wall may have a gradually decreasing thickness from the butt end 12 toward the tip 13 depending upon the characteristics to be imparted.

Within the body 10 there is an inner or core member 16 having, at the butt end, a snug fit with the outer member 10. The core member is a slender conical shell secured to the outer member, as shown. The joint between the body 10, member 16 and butt end or handle 17 may be of any convenient construction as long as the parts have no tendency to separate when subjected to the bending forces imposed on the rod during use. Inasmuch as the handle, reel support and grip, if any, are conventional, elaboration is deemed unnecessary. Referring to FIGS. 1 and 2, it will be noted that the areas of contact between the basal ends of the inner and outer members 10 and 16 are uninterrupted as, for example, by reducing the diameter of the inner member. To do so, would necessitate a shoulder at the place where the diameter of the inner member is reduced. Thus, a less abrupt transmission is avoided which, otherwise, would create a region of concentrated stress, possibly leading to a fracture at said reduced area.

At this juncture it is pointed out that the body 10 and parts 16 and 17 are axially non-displaceable with respect to each other and to the butt end 17. As described thus far the rod, upon being subjected to a load, i.e. a hooked fish, will be deflected and the extent of such deflection will be a function of the dead weight of the fish plus loading due to its efforts to dislodge the hook. However, as flexing continues, i.e. gradual increase in load, the tip 20 of the core member 16 is brought into contact with the interior of the outer member 10 and part of the load is absorbed by the core member 16.

As a consequence members 10 and 16 begin to function jointly, i.e. bending of the sleeve 10 will then compound with bending of the core member 16. Thus, the resistance to bending exhibited by the sleeve member 10 alone now increases and the assembly becomes gradually stiffer or, otherwise stated, the resistance of the core member 16 is added to the resistance of the sleeve 10 with the advantages hereinbefore set forth.

FIGS. 5 to 7 depict application of the principles of the invention to an archery bow. It is believed that details of construction and operation will be evident from the drawing and the preceding description. In this case a typical transverse cross section will be essentially rectangular as shown to conform to a common type bow. Reference numerals 10a and 16a indicate the outer sleeve and core member respectively. The drawing shows a rectilinear cross-section. The act of drawing the bow will bend the composite cantilever assembly perpendicular to the altitude of the shorter sides of the cross-section. The cross-sectional portions 10a and 16a read with respect to FIGS. 6 and 7 indicate a spacing of the inner lever within the outer lever. The spacing shown in FIG. 7 is by way of example, and the cross-sectional portion 16a could be positioned other than is shown in this figure, depending upon the amount of additional resistance desired to be imparted to the composite cantilever bow assembly. In order to preclude relative shifting of these two parts in a longitudinal sense, adhesive, rivets, screws or equivalent fastening means (not shown) may be employed at some region at the mid-point of the overall length of the bow in order to insure that the bending function of the inner and outer members is not interfered with.

FIGS. 8, 9 10 and 11 show various modifications of the composite cantilever fishing rod assembly of the present invention, the constructions of which are believed to be apparent from the description of the remaining figures. In the case of the inner member, the reference numeral 16 becomes 16(b), 16(c), and 16(d). The reference numeral 25 in FIG. 9 indicates an inner member having a solid cross-section. Since no change in the configuration of the outer member is made in these figures, the same reference numeral, namely 10, has been used. With respect to FIG. 11 particularly, the joint flexing movement of the inner and outer lever members is confined essentially to a region between the distal end of the rod and the point approximately one-third the distance from the basal portion to the distal tip. For some uses, flexer is desirably confined to a longitudinal part of the composite cantilever fishing rod adjacent the tip end.

I claim:

1. Composite, resilient, cantilevered lever means useful in the construction of sporting equipment comprising a handle portion and at least one elongated resilient lever assembly extending therefrom to a tapered tip end, the handle portion being held substantially fixed and the lever assembly being flexed from its normal position of coaxiality of its elongated axis with the handle portion upon application of a force to said tip end, said elongated assembly comprising a hollow outer lever and an inner lever therein, said outer and inner levers being attached at their respective base ends to a handle portion, the outer lever continuously tapering to said tip end from said handle portion, the inner lever having a cross-sectional area less than the inner cross-sectional area of the outer lever to define an annular space between the inner surface of the outer lever and the outer surface of the inner lever along at least a portion of the length of said outer lever from the handle portion toward said tip, the inner lever having a length less than said outer lever, the outer surfaces of said inner lever being continuous and without deformation.

2. The assembly according to claim 1 wherein said inner lever comprises a hollow, elongated, cone-line element, the apical angle of the cone-like member being less than the apical angle of the inner surface of said outer lever.

3. The assembly according to claim 1 wherein the apical angle of the inner lever is greater than the apical angle of the inner surface of the outer lever.

4. The assembly according to claim 1 wherein the apical angle of the inner lever is equal to the apical angle of the inner surface of the outer lever.

5. The assembly according to claim 1 wherein the inner lever has a solid cross-section.

6. The assembly according to claim 1 wherein the outer surface of the base of the inner lever is in contact with the inner surface of the base of the outer lever at the attachment to the handle portion.

7. The assembly according to claim 1 wherein the base portion of the inner lever is spaced from the base portion of the outer lever at the area of attachment to the handle portion.

8. The assembly according to claim 1 wherein the inner lever is a hollow, cylindrical element and the base of the inner lever is spaced from the base of the outer lever at the area of attachment to the handle portion.

9. The assembly according to claim 1 wherein said inner lever comprises a cone-like element of solid cross-section.

10. The assembly according to claim 1 wherein the outer lever is a cone-like element having an apical angle greater than the apical angle of the inner lever.

11. The assembly according to claim 1 wherein the handle portion has a substantially identical elongated resilient lever assembly extending an equal distance from each end of the handle portion, the said inner levers likewise extending an equal distance from each end of the handle portion within said outer lever but of a length less than the outer lever.

12. The assembly according to claim 11 wherein the outer levers are of rectangular cross-section along the major axis of the assembly, the outer levers flexing equally throughout their lengths in the direction perpendicular to the major axis of the assembly cross-section upon the application of force to the tip ends, the two opposing sides of each outer lever parallelling the major axis of the outer lever cross-section tapering toward each other from the handle portion toward each end, the other two opposing sides perpendicular to the major axis of the outer lever cross-section remaining parallel.

13. The assembly according to claim 11 wherein within the handle portion each inner lever is of a rectangular cross-section substantially parallel to the interior cross-section of the outer lever and in contact therewith in said handle portion, the outer surface of the respective shorter sides of the inner lever remaining in contact with the corresponding inner surfaces of the outer lever along the length of the inner lever, the minor axes of the rectilinear cross-sections of the inner levers decreasing along the lengths of the inner levers from the handle portion to the ends thereof.

14. The assembly according to claim 13 wherein the reduction in length of the minor axis of the cross-section of the inner lever is uniform along the length of the inner lever with reference to the major axis thereof.

15. The assembly according to claim 13 wherein the decrease in the length of the minor axis of the rectangular cross-section of the inner lever along its length is non-uniform with reference to the major axis thereof.

16. The assembly according to claim 1 wherein the outer lever is of elongate conical form and attached at its base end to the handle portion, the inner lever comprising a hollow, elongated, cone-like member depending at its apex from the distal end of the outer lever.

17. The assembly according to claim 1 wherein the length of the inner lever is between 50% and 65% of the length of the outer lever.

18. A structure useful in the construction of a fishing rod comprising an elongated, resilient lever assembly including a basal end and a distal end, the basal end being held relatively fixed and the distal end being adapted to flex upon application of a load to the tip thereof said assembly comprising a hollow outer member and an inner member therewithin, the inner surface of the outer member being conical with the base of the cone at said basal end, the exterior of the inner member being conical and the apical angle of the inner member with reference to the apical angle of the interior of the outer member defining an annular space between the inner member and outer member interior, the apex of the inner member being located short of the distal end of the outer member.

19. A fishing rod comprising an elongated outer member and an elongated inner member therewithin, each member having a basal end, said ends being attached to constitute a handle, the outer member having a conical interior with its apex at the end of the rod remote from the basal end, and the inner member having a conical exterior, the apex whereof is located short of the apex of the outer member, the apical angle of the outer surface of the inner member relative to the apical angle of the inner surface of the outer member defining a conical annular space therebetween, both said members comprising resilient material, the outer surface of the inner member being spaced away from the inner surface of the outer member for the whole joint extent of the inner and outer members, the ends of the inner and outer members being tightly fitted together to constitute a handle and the inner and outer members each having a continuous surface extending from the handle outwardly to the respective apicies free from any reentrant portions.

20. A fishing rod having a basal part at one end, and a slender, elongated, resilient rod assembly extending from the basal end to a distal end, said rod assembly flexing over its length when held at the basal end and a load applied to the distal end, said elongated rod assembly comprising an elongated, resilient, hollow, conical outer member having its base diameter at said basal end and its apex at the distal end, a conical inner member positioned within said outer member, the base of the inner member being positioned adjacent the basal end of the outer member and being secured thereto, the apical angle of the inner member relative to the apical angle of the outer member defining a space between the inner member and the outer member thus permitting relatively independent bending between the outer member and the inner member when a load is applied to the distal end of the assembly, an increase in the applied load causing joint bending of the outer member and the inner member in response to the load, the flexing portions of the outer member and inner member which share in the bending determined by the respective apical angles and length of the inner member.

21. A deformable cantilever assembly comprising a first, elongated, resilient, conical sleeve member, and a second resilient, conical sleeve member of lesser length mounted within the first member, said members having a handle common to said members, adjacent basal portions of each member being secured to said handle each member having its respective distal end, said members being concentric and radially spaced apart to form an annular space therebetween, the members being coextensive for a distance beginning at the base and having a common axis, the second member extending from the handle toward the end of the first member a distance determined by the relationship of the respective apical angles of each member which will achieve a pre-determined reaction to a load applied to the end of said first member, the annular space between the two members being so proportioned that, upon application of a transverse load to the distal end of the first member substantially perpendicularly to the common axis, the first member is initially displaced from the axis and, upon increase in said load, the first member is brought against the second member to displace the same from the axis whereby the load encounters increased reaction by reason of the joint resistance to bending of both members.

22. A mechanical assembly on the order of a cantilever beam comprising first and second frustoconical, nested resilient shells, the shells including means to affix one end of each thereof to a supporting surface, the members, in the unloaded condition, being spaced apart throughout their respective co-extensive portions, the space therebetween being bounded on the exterior thereof by circles of gradually decreasing diameter measured away from the affixing means and on the interior by circles decreasing in diameter at a faster rate than the first mentioned circles whereby, upon application of a load to the free end of the first shell, the free end thereof will abut the exterior of the second member whereafter continued application of the load will bend both members to add the resistance to bending of the second member to the resistance to bending of the first member.

* * * * *